United States Patent
Reynolds et al.

(10) Patent No.: US 7,721,539 B2
(45) Date of Patent: May 25, 2010

(54) SYSTEM FOR CONTROLLING ENGINE FUELING TO LIMIT ENGINE OUTPUT POWER

(75) Inventors: David J. Reynolds, Memphis, IN (US); Zachary Schwab, Columbus, IN (US); Ralph Gutman, Columbus, IN (US)

(73) Assignee: Cummins Inc., Columbus, IN (US)

( * ) Notice: Subject to any disclaimer, the term of this patent is extended or adjusted under 35 U.S.C. 154(b) by 313 days.

(21) Appl. No.: 11/743,010

(22) Filed: May 1, 2007

(65) Prior Publication Data

US 2008/0271452 A1 Nov. 6, 2008

(51) Int. Cl.
*F02D 23/00* (2006.01)
*F02D 31/00* (2006.01)
*F02M 7/00* (2006.01)
*G06G 7/70* (2006.01)

(52) U.S. Cl. .......................... 60/601; 60/603; 123/357; 123/435; 701/103; 701/115

(58) Field of Classification Search ........... 60/600–603; 701/103, 104, 105, 115; 123/357, 305, 435
See application file for complete search history.

(56) References Cited

U.S. PATENT DOCUMENTS

| | | | |
|---|---|---|---|
| 4,044,560 A * | 8/1977 | Dorsch et al. ............. | 60/601 |
| 4,492,203 A * | 1/1985 | Yutaka ...................... | 123/478 |
| 4,603,552 A * | 8/1986 | Kido ......................... | 60/605.1 |
| 5,174,259 A * | 12/1992 | Shinzawa .................. | 123/357 |
| 5,377,112 A | 12/1994 | Brown, Jr. et al. ........ | 701/115 |
| 5,546,911 A * | 8/1996 | Iwamoto et al. .......... | 123/497 |
| 5,771,861 A | 6/1998 | Musser et al. ............. | 123/357 |
| 6,155,050 A * | 12/2000 | Blanz et al. ............... | 60/603 |
| 6,256,992 B1 | 7/2001 | Lewis, Jr. et al. ......... | 60/603 |
| 6,619,261 B1 | 9/2003 | Wang et al. ............... | 123/435 |
| 6,725,659 B1 * | 4/2004 | Shao et al. ................. | 60/601 |
| 6,898,508 B2 * | 5/2005 | Nakano et al. ............ | 701/103 |
| 6,944,532 B2 | 9/2005 | Bellinger .................. | 701/115 |
| 7,127,345 B2 * | 10/2006 | Chen et al. ................ | 701/105 |
| 2005/0098146 A1 | 5/2005 | Lee .......................... | 103/305 |
| 2006/0218920 A1 * | 10/2006 | Gokhale .................... | 60/601 |
| 2009/0043485 A1 * | 2/2009 | Banks ....................... | 701/114 |
| 2009/0078236 A1 * | 3/2009 | Gallagher et al. ......... | 701/103 |

OTHER PUBLICATIONS

PCT International Search Report and Written Opinion dated Aug. 8, 2008 relating to PCT/US2008/060504.

* cited by examiner

*Primary Examiner*—Thai Ba Trieu
(74) *Attorney, Agent, or Firm*—Barnes & Thornburg LLP; J. Bruce Schelkopf (57) ABSTRACT

A method for controlling fueling of an internal combustion engine is provided. The engine may include an intake manifold, one or more exhaust manifolds and a turbocharger coupled between the intake and exhaust manifolds. The method may comprise estimating an operating condition of the turbocharger, determining a maximum value of an operating parameter as a function of the estimated operating condition of the turbocharger, measuring a value of the operating parameter, determining an error value as a function of the maximum value of the first operating parameter and the measured value of the operating parameter, and limiting fuel supplied to the engine based on the error value.

4 Claims, 7 Drawing Sheets

SYSTEM FOR CONTROLLING ENGINE FUELING TO LIMIT ENGINE OUTPUT POWER

FIELD OF THE INVENTION

The present invention relates generally to systems and method for controlling fueling of an internal combustion engine, and more specifically to such systems and methods for controlling fueling to limit engine output power.

BACKGROUND

Internal combustion engines may produce excessive output power in response to a number of influences, one of which is overfueling, i.e., supplying excessive fuel to the engine. Causes of overfueling may include, for example, but are not limited to, so-called fueling growth that may occur over time as fuel injectors wear, tampering with engine and/or fuel system components in an attempt to increase engine output power, and the like. It is desirable to control engine fueling in a manner that limits engine output power resulting from overfueling.

SUMMARY

The present invention may comprise one or more of the features recited in the attached claims, and/or one or more of the following features and combinations thereof. A method for controlling fueling of an internal combustion engine is provided. The engine may include an intake manifold, one or more exhaust manifolds and a turbocharger coupled between the intake and exhaust manifolds. The method may comprise estimating an operating condition of the turbocharger, determining a maximum value of an operating parameter as a function of the estimated operating condition of the turbocharger, measuring a value of the operating parameter, determining an error value as a function of the maximum value of the first operating parameter and the measured value of the operating parameter, and limiting fuel supplied to the engine based on the error value.

Estimating an operating condition of the turbocharger may comprise determining ambient pressure, and estimating an air inlet density of a compressor of the turbocharger as a function of the ambient pressure. Estimating an operating condition of the turbocharger may further comprise determining ambient temperature, and estimating the air inlet density of the compressor as a function of both the measured ambient pressure and the measured ambient temperature.

Determining a maximum value of an operating parameter may comprise determining a maximum value of rotational speed of the turbocharger as a function of the air inlet density of the compressor of the turbocharger. Measuring a value of the operating parameter may comprise measuring turbocharger rotational speed. Limiting fuel supplied to the engine may comprise determining an engine acceleration value, determining a limit value as a function of the error value and of the engine acceleration value in a manner that limits the turbocharger rotational speed to the maximum value of rotational speed of the turbocharger, and limiting fuel supplied to the engine as a function of the limit value.

Determining a maximum value of an operating parameter may alternatively or additionally comprise measuring turbocharger rotational speed, and determining a maximum value of engine boost pressure as a function of the air inlet density of the compressor of the turbocharger and also as a function of the measured turbocharger rotational speed. Measuring a value of the operating parameter may comprise measuring engine boost pressure. Limiting fuel supplied to the engine may comprise determining an engine acceleration value, determining a limit value as a function of the error value and of the engine acceleration value in a manner that limits the engine boost pressure to the maximum value of engine boost pressure, and limiting fuel supplied to the engine as a function of the limit value.

Determining a maximum value of an operating parameter may alternatively or additionally comprise measuring engine exhaust temperature, and determining a maximum value of engine boost pressure as a function of the air inlet density of the compressor of the turbocharger and also as a function of the measured engine exhaust temperature. In one illustrative embodiment, measuring engine exhaust temperature may comprise measuring a cylinder exhaust temperature produced by each cylinder of the engine, and computing an average of the measured cylinder exhaust temperatures. In another illustrative embodiment, measuring exhaust temperature may comprise determining a stack temperature corresponding to a temperature of exhaust gas flowing through the one or more exhaust manifolds. Measuring a value of the operating parameter may comprise measuring engine boost pressure. Limiting fuel supplied to the engine may comprise determining an engine acceleration value, determining a limit value as a function of the error value and of the engine acceleration value in a manner that limits the engine boost pressure to the maximum value of engine boost pressure, and limiting fuel supplied to the engine as a function of the limit value.

Determining a maximum value of an operating parameter may alternatively or additionally comprise determining a maximum value of engine exhaust temperature as a function of the air inlet density of the compressor of the turbocharger. Measuring a value of the operating parameter comprises measuring engine exhaust temperature. Measuring engine exhaust temperature may comprise measuring a cylinder exhaust temperature produced by each cylinder of the engine, and computing an average of the measured cylinder exhaust temperatures. Determining a maximum value of engine exhaust temperature may comprise determining a maximum value of average exhaust temperature as a function of the air inlet density of the compressor of the turbocharger, the maximum value of average exhaust temperature corresponding to a maximum value of the average of the cylinder exhaust temperatures. Limiting fuel supplied to the engine may comprise determining an engine acceleration value, determining a limit value as a function of the error value and of the engine acceleration value in a manner that limits the engine exhaust temperature to the maximum value of engine exhaust temperature, and limiting fuel supplied to the engine as a function of the limit value.

Another method for controlling fueling of an internal combustion engine is provided. The engine may include a turbocharger having a compressor fluidly coupled to an intake manifold of the engine and a turbine fluidly coupled to one or more exhaust manifolds of the engine. The method may comprise determining ambient pressure, estimating an air inlet density of the turbocharger compressor as a function of the ambient pressure, measuring rotational speed of the turbocharger, determining a first maximum value of engine boost pressure as a function of the air inlet density of the turbocharger compressor and of the rotational speed of the turbocharger, measuring engine exhaust temperature, determining a second maximum value of engine boost pressure as a function of the air inlet density of the turbocharger compressor and of the engine exhaust temperature, measuring engine boost pressure, determining an error value as a function of a minimum of the first maximum value of engine boost pressure and the second maximum value of engine boost pressure and also as a function of the measured engine boost pressure, and limiting fuel supplied to the engine based on the error value.

In one illustrative embodiment, measuring engine exhaust temperature may comprise measuring a cylinder exhaust temperature produced by each cylinder of the engine, and computing an average of the measured cylinder exhaust temperatures. In another illustrative embodiment, measuring exhaust temperature may comprise determining a stack temperature corresponding to a temperature of exhaust gas flowing through the one or more exhaust manifolds.

Limiting fuel supplied to the engine may comprise determining an engine acceleration value, determining a limit value as a function of the error value and of the engine acceleration value in a manner that limits the engine boost pressure to the minimum of the first and second maximum values of engine boost pressure, and limiting fuel supplied to the engine as a function of the limit value.

Yet another method for controlling fueling of an internal combustion engine is provided. The engine may include a turbocharger having a compressor fluidly coupled to an intake manifold of the engine and a turbine fluidly coupled to at least one exhaust manifold of the engine. The method may comprise determining ambient pressure, estimating an air inlet density of the turbocharger compressor as a function of the ambient pressure, measuring rotational speed of the turbocharger, determining a first maximum value of engine boost pressure as a function of the air inlet density of the turbocharger compressor and of the rotational speed of the turbocharger, measuring engine exhaust temperature, determining a second maximum value of engine boost pressure as a function of the air inlet density of the turbocharger compressor and of the engine exhaust temperature, measuring engine boost pressure, determining a first error value as a function of a minimum of the first maximum value of engine boost pressure and the second maximum value of engine boost pressure and also as a function of the measured engine boost pressure, determining a maximum value of rotational speed of the turbocharger as a function of the air inlet density of the turbocharger compressor, determining a second error value as a function of the maximum value of rotational speed of the turbocharger and of the measured rotational speed of the turbocharger, determining a maximum value of engine exhaust temperature as a function of the air inlet density of the turbocharger compressor, determining a third error value as a function of the maximum value of engine exhaust temperature and of the measured engine exhaust temperature, and limiting fuel supplied to the engine based on a minimum of the first, second and third error values.

Limiting fuel supplied to the engine may comprise determining an engine acceleration value, determining a limit value as a function of the minimum of the first, second and third error values and of the engine acceleration value, and limiting fuel supplied to the engine as a function of the limit value.

Still another method is provided for controlling fueling of an internal combustion engine. The engine may include a fuel system having at least one fuel injector and a turbocharger having a compressor fluidly coupled to an intake manifold of the engine and a turbine fluidly coupled to at least one exhaust manifold of the engine. The method may comprise determining a fuel quantity to inject into the engine via the at least one fuel injector, mapping the determined fuel quantity to at least one injector on-time, determining a fuel limit value as a function of one or more of a difference between a maximum turbocharger speed and a measured turbocharger speed, a difference between a maximum boost pressure and a measured boost pressure and a difference between a maximum engine exhaust temperature and a measured engine exhaust temperature, and reducing the at least one injector on-time if the fuel limit value exceeds a threshold fuel value for at least a predetermined time period.

Reducing the at least one injector on-time may comprise reducing the at least one injector on-time by a predetermined time value. The engine may further include an ignition key that is in an on state when the engine is running and is in an off state when the engine is not running. Reducing the at least one injector on-time may further comprise reducing the at least one injector on-time by the predetermined time value each time the ignition key transitions from its off state to its on state if the fuel limit value exceeds a threshold fuel value for at least a predetermined time period.

The method may further comprise determining a change in the at least one injector on-time, and activating an error flag if the change in the at least one injector on-time exceeds a threshold value. Alternatively or additionally, the method may comprise activating visual indicator if the change in the at least one injector on-time exceeds a threshold value.

Reducing the at least one injector on-time may further comprise limiting reduction of the at least one injector on-time to a minimum reduction value.

The engine may include an intake manifold pressure sensor configured to produce the measured boost pressure value and an ambient pressure sensor. The method may further comprise determining whether the intake manifold pressure sensor has failed, and determining whether the ambient pressure sensor has failed. Reducing the at least one injector on-time may comprise reducing the at least one injector on-time if the fuel limit value exceeds the threshold fuel value for at least the predetermined time period only if the intake manifold pressure sensor has not failed and the ambient pressure sensor has not failed. The method may further comprise maintaining the at least one injector on-time if at least one of the intake manifold pressure sensor has not failed and the ambient pressure sensor has not failed.

The method may further comprise limiting the determined fuel quantity to the fuel limit value prior to mapping the determined fuel quantity to at least one injector on-time.

A further method is provided for controlling fueling of an internal combustion engine. The engine may include a fuel system having at least one fuel injector and a turbocharger having a compressor fluidly coupled to an intake manifold of the engine and a turbine fluidly coupled to at least one exhaust manifold of the engine. The method may comprise measuring engine rotational speed, determining a maximum engine output torque of the engine as a function of the measured engine rotational speed, determining a fuel limit value as a function of one or more of a difference between a maximum turbocharger speed and a measured turbocharger speed, a difference between a maximum boost pressure and a measured boost pressure and a difference between a maximum engine exhaust temperature and a measured engine exhaust temperature, determining a fueling growth derate amount as a function of the fuel limit value and the maximum engine output torque if engine fueling is being limited by the fuel limit value, and activating an error flag if the fueling growth derate amount is greater than a threshold value.

The method may further comprise activating visual indicator if the fueling growth derate amount is greater than the threshold value.

A system may also be provided that has a control circuit with a memory having stored therein instructions that are executable by the control circuit to carry out any one or combination of the features described in this section.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
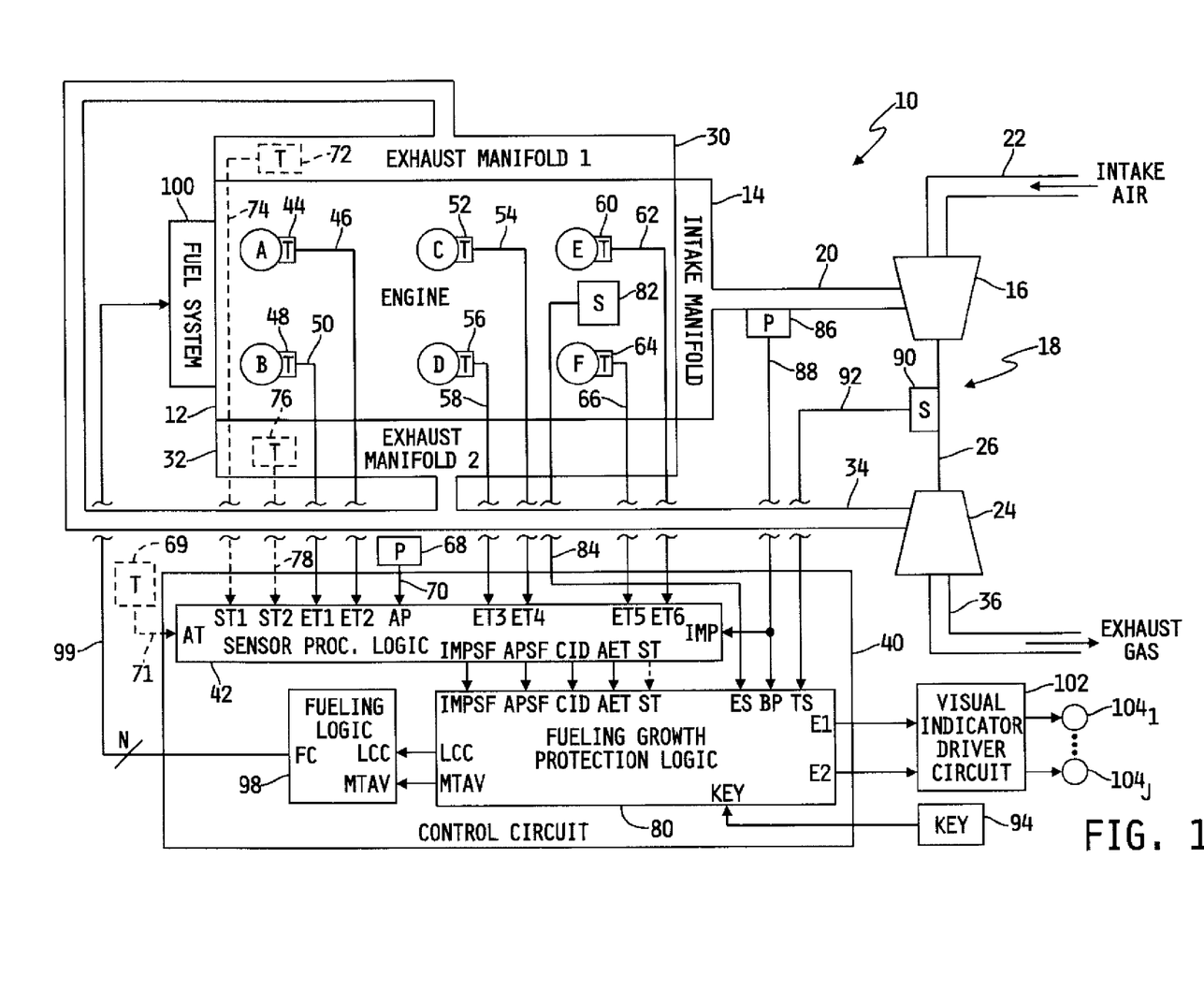
FIG. 1 is a block diagram of one illustrative embodiment of a system for controlling fueling of an internal combustion engine.

Referring to FIG. 1, a block diagram of one illustrative embodiment of a system 10 for controlling fueling is shown. In the illustrated embodiment, the engine 12 includes an intake manifold 14 fluidly coupled to a fresh air outlet of a compressor 16 of a turbocharger 18 via an intake air conduit 20. A fresh air inlet of the compressor 16 is fluidly coupled to a fresh air intake conduit 22. A turbine 24 of the turbo charge 18 is mechanically coupled via a rotational driveshaft 26 to the compressor 16 in a conventional manner. An exhaust gas inlet of the turbine 24 is fluidly coupled to at least one exhaust manifold of the engine 12 via an exhaust gas conduit 34. The engine 12 may have any number of cylinders, and in the illustrated embodiment, the engine 12 is a six-cylinder engine having cylinders A-F, and exhaust gas exiting three of the cylinders, e.g., cylinders A, C and E, is passed to the exhaust conduit 34 via one exhaust manifold 30, and exhaust gas exiting the remaining three cylinders, e.g., cylinders B, D, F, is passed to the exhaust conduit 34 via a second exhaust gas manifold 32. It will be understood, however, that the engine 12 may alternatively be implemented in a so-called straight-lined cylinder configuration having any number of cylinders, and in which exhaust gases exiting all such cylinders pass to the exhaust gas conduit 34 via a single exhaust gas manifold. Thus, for purposes of this disclosure, the engine 12 may include one or more exhaust gas manifolds. In any case, the exhaust gas outlet of the turbine 24 is fluidly coupled to an exhaust gas conduit 36.

The system 10 further includes a control circuit 40 that is configured to control the overall operation of the engine 12. In one embodiment, the control circuit 40 is a microprocessor-based control circuit typically referred to as an electronic or engine control module (ECM), or electronic or engine control unit (ECU). It will be understood, however, that the control circuit 40 may generally be or include one or more general purpose or application specific control circuits arranged and operable as described hereinafter. The control circuit 40 includes a number of software algorithm blocks or modules that are stored in a memory unit of the control circuit 40 and are responsive to one or more operating conditions of the engine 12 to control operation of the engine 12. Generally, the number of software algorithms are stored in the memory unit of the control circuit 40 are stored in the form of instructions that are executable by the control circuit 40 to cause the system 10 to operate in the manner described herein.

One such software algorithm block is a sensor processing logic block 42 which is configured to receive a number of sensor signals, process such signals, and produce a number of intermediate values that may be used by other logic blocks within the control circuit 40. In the illustrated embodiment, each of the cylinders A-F of the engine 12 includes a temperature sensor configured to produce a temperature signal indicative of a temperature exhaust gas exiting the corresponding cylinder. For example, an exhaust gas temperature sensor 44 is electrically connected to an exhaust temperature input, ET2, of the sensor logic block 32 via a signal path 46, wherein the temperature signal produced by the temperature sensor 44 is indicative of exhaust gas temperature produced by cylinder A. Likewise, temperature sensors 50, 52, 56, 60 and 64 are electrically connected to corresponding inputs ET1, ET4, ET3, ET6 and ET5 of the sensor processing logic block 42 via corresponding signal paths 52, 54, 58, 62 and 66. The sensor processing logic block 42 is configured to process the exhaust gas temperature signals produced by the sensors 44, 48, 52, 56, 60 and 64 in a manner that determines and produces an average exhaust temperature value, AET. In one embodiment, for example, the sensor processing logic block 42 is operable to determine the average exhaust temperature value, AET, as a running average of the exhaust gas temperatures produced by each of the cylinders A-F, although other conventional signal averaging techniques are contemplated by this disclosure.

Alternatively or additionally, the one or more exhaust gas manifolds may include a temperature sensor configured to produce a temperature signal that is indicative of a temperature of exhaust gas exiting the one or more manifolds. In the illustrative embodiment, for example, the engine 12 includes two exhaust gas manifolds 30 and 32, and in this example the exhaust manifold 30 optionally includes an exhaust temperature sensor 72 that is electrically connected via a signal line 74 to a first stack temperature input, ST1, of the temperature processing logic block 42, and the exhaust manifold 32 optionally includes a second temperature sensor 76 that is electrically connected via a signal path 78 to a second stack temperature input, ST2, of the sensor processing logic block 42. In lieu of, or in addition to, the average exhaust temperature value, AET, the sensor processing logic block 42 may produce a so-called stack temperature value, ST, as an average of the exhaust manifold of temperature values produced by the temperature sensors 72 and 76. In embodiments including only a single exhaust manifold, the stack temperature, ST, will correspond to the temperature signal produced by only a single one of the exhaust manifold temperature sensors. In an alternate embodiment, one or more temperature sensors may be positioned downstream of the turbocharger 18 and in fluid communication with the exhaust gas conduit, and in this embodiment the stack temperature, ST, may correspond to one or an average of exhaust gas temperature signals produced by the one or more such temperature sensors.

The system 10 further includes a pressure sensor 68 that is electrically connected to an ambient pressure input, AP, of the sensor processing block 42 via a signal path 70. The pressure sensor 68 is suitably positioned such that the pressure signal produced by the pressure sensor 68 corresponds to ambient or barometric pressure. Additionally, the system 10 may further include a temperature sensor 69 as shown in phantom FIG. 1, that is electrically connected to an ambient temperature input, AT, via a signal path 71. In such cases, the temperature sensor 69 is suitably positioned such that the temperature signal produced by the temperature sensor 69 corresponds to ambient temperature. The sensor processing logic block 42 is configured, any embodiments of the system 10 that include only the ambient pressure sensor 68, to compute a compressor inlet density value, CID, according to the equation compressor inlet density equals 3.44*AP/(AT+273). In embodiments of the system 10 that do not include an ambient temperature sensor 69, AT in the foregoing equation is a calibrated constant. In alternative embodiments wherein the system 10 includes both an ambient pressure sensor 68 and the ambient temperature sensor 69, the sensor processing logic block 42 is operable to compute the compressor inlet density value using the foregoing equation in which AP and AT are both measured values. In any case, the compressor inlet density value, CID, corresponds to the air inlet density of the compressor 16 of the turbocharger 18, and is generally a function of the altitude at which the vehicle carrying the engine 12 is operating. In alternate embodiments, other conventional techniques may be used to estimate or otherwise determine the ambient pressure value, and thus the compressor inlet density value. For example, although not illustrated in FIG. 1, the system 10 may include a conventional global positioning system (GPS) that is configured to produce an altitude signal corresponding to the altitude at which the system 10 is operating, and the control circuit 40 may further include a map or table that maps the altitude measured by the GPS unit to a corresponding estimated ambient pressure value. As another example, signals from one or more other pressure sensors including within the system 10 (not shown), and/or other types of sensors within the system 10, may be used at engine start up, shut down and/or one or more predetermined operating conditions, to estimate the ambient pressure. In any case, the sensor processing logic block 42 is operable as just described to determine ambient pressure using any one of the foregoing techniques, and to optionally determine ambient temperature, and to then determine the compressor inlet density value, CID, as a function of ambient pressure alone or as a function of ambient pressure and ambient temperature.

The sensor processing logic block 42 further includes a conventional sensor diagnostic algorithm that is configured to monitor the operation of the ambient pressure sensor 68, and to control the value of an ambient pressure sensor failure value, APSF, based on the operational state of the ambient pressure sensor 68. For example, APSF may be set to "1" by the ambient pressure sensor diagnostic algorithm when it is determined that the ambient pressure sensor 68 is functioning normally, and to otherwise set APSF to "0." It will be understood that the sensor diagnostic algorithm may alternatively set APSF to other suitable but distinguishable states that reflect failed and normal states respectively of the ambient pressure sensor 68.

The system 10 further includes an intake manifold pressure sensor, or so-called boost pressure sensor, 86 that is electrically connected to an intake manifold pressure input, IMP, of the sensor processing logic block 42 via a signal path 88. The pressure sensor 86 is configured to produce a pressure signal that corresponds to the pressure within the air intake conduit 20 that is connected between the compressor 16 of the turbocharger 18 and the intake manifold 14. The sensor processing logic block 42 further includes a conventional intake manifold pressure sensor diagnostic algorithm that is configured to monitor the operational state of the pressure sensor 86 (along with other intake manifold pressure sensors included within the system 10) and to control the state of an intake manifold pressure sensor fault value, IMPSF, based on the operational state of the intake manifold pressure sensor(s). In the illustrated embodiment, for example, the intake manifold pressure sensor diagnostic algorithm is operable to set IMPSF to a "0" if the intake manifold pressure sensor 86 is operating normally, and to otherwise set IMPSF to a "1." It will be understood that the intake manifold pressure sensor diagnostic algorithm may alternatively set IMPSF to other suitable but distinguishable states that reflect failed and normal states respectively of the intake manifold pressure sensor 86.

The control circuit 40 further includes a fueling growth protection logic block 80 that is configured to receive as inputs the compressor inlet density value, CID, the average exhaust temperature value, AET, the intake manifold pressure sensor failure value, IMPSF, and the ambient pressure sensor failure value, APSF. In embodiments that include the temperature sensors 72 or 76, the stack temperature value, ST, that is produced by the sensor processing logic block 42 may additionally be provided as an input to the fueling growth protection logic block 80. The fueling growth protection logic block 80 further includes an engine speed input, ES, which receives an engine speed, ES, via a signal path 84. The engine speed sensor 82 may be a conventional sensor, e.g., a Hall effect sensor or other suitable sensor that is configured to produce a speed signal corresponding to the rotational speed of the engine 12.

The fueling growth protection logic block 80 further includes a boost pressure input, BP, which receives the intake manifold pressure signal or boost pressure signal from the pressure sensor 86. For purposes of this document, the terms intake manifold pressure and boost pressure may be used interchangeably, and both refer to air pressure within the intake manifold 14 and intake air conduit 20. The fueling growth protection logic block further includes a turbocharger speed input, TS, that is electrically connected to a turbocharger speed sensor 90 via a signal path 92. The turbocharger speed sensor 90 may be a conventional speed sensor that produces a speed signal corresponding to the rotational speed of the driveshaft 26 of the turbocharger 18. The fueling growth protection logic block 80 further includes a key input, KEY, that is electrically connected to an ignition key switch or circuit 94. The ignition key switch or circuit 94 is operable in a conventional manner to produce a "1" when the ignition key is turned on, and produces a "0" when the ignition key is turned off. It will be understood that the ignition key switch or circuit 94 may alternatively produce other suitable but distinguishable states that reflect the "on" and "off" positions respectively of the ignition key switch 94. The fueling growth protection logic block 80 further includes a pair of outputs E1 and E2 that are both electrically connected to a visual indicator driver circuit 102 that is configured to drive a number, J, of visual indicators, e.g., dash-mounted lamps or other conventional visual indicators, $104_1$-$104_J$, wherein J may be any positive integer.

The control circuit 40 further includes a fueling logic block 98 having a number, N, of signal paths connected between a fuel command output, FC, of the fueling logic block 98 and a fuel system 100 coupled to the engine 12, wherein N may be any positive integer. The fuel system 100 is a conventional fuel system that is configured to supply fuel to the engine 12 in accordance with fuel command signals, FC, produced by the fueling logic block 98. In the illustrated embodiment, the fueling growth protection logic block 80 supplies a limited combustion command value, LCC, and a modified timing adjustment value, MTAV, to the fueling logic block 98.

Figure 2:
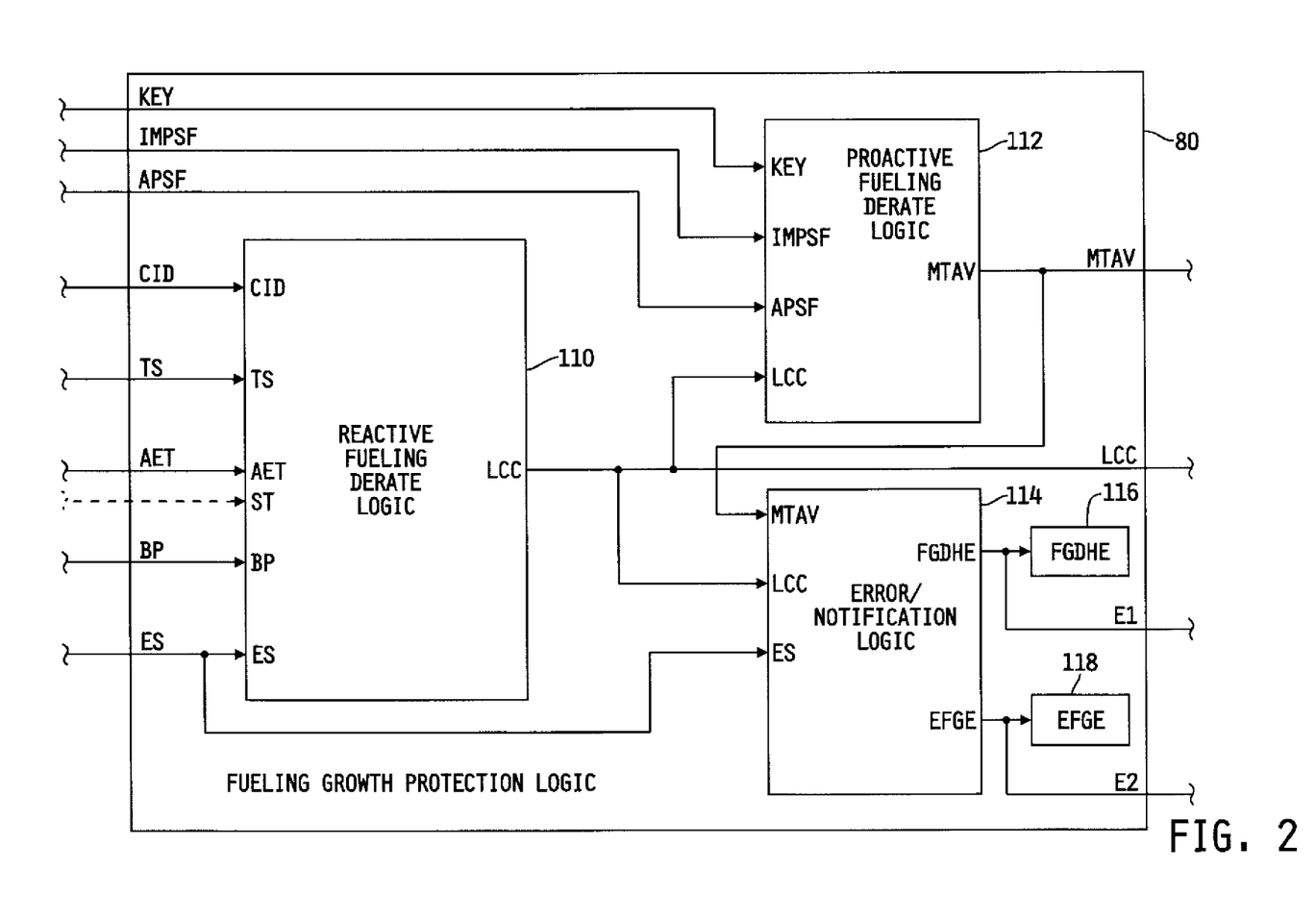
FIG. 2 is a block diagram of one illustrative embodiment of the fueling growth protection logic block of the system of FIG. 1.

Referring now to FIG. 2, a block diagram of one illustrative embodiment of the fueling growth protection logic block 80 of FIG. 1 is shown. In the illustrated embodiment, the fueling growth protection logic block 80 includes a reactive fueling derate logic block 110 that is configured to receive as inputs the compressor inlet density value, CID, the turbocharger speed, TS, the average exhaust temperature value, AET, the boost pressure, BP, and the engine speed, ES. Optionally, as shown by dashed-line representation in FIG. 2, the reactive fueling derate logic block 110 may further include an input that receives the stack temperature, ST, as described hereinabove. The reactive fueling derate logic block 110 is operable, as will be described in greater detail hereinafter, to process the foregoing input signals and produce as an output a limited combustion command value, LCC.

The fueling growth protection logic block 80 further includes a proactive fueling derate logic block 112 that is configured to receive as inputs the limited combustion command value, LCC, produced by the reactive fueling derate logic block 110, the ignition key value, KEY, the intake manifold pressure sensor failure value, IMPSF, and the ambient pressure sensor failure value, APSF. The proactive fueling derate logic block 112 is operable, as will be described in greater detail hereinafter, to process the foregoing inputs and produce as an output a modified timing adjustment value, MTAV.

The fueling growth protection logic block 80 further includes an error/notification logic block 114 that is configured to receive as inputs the modified timing adjustment value, MTAV, the limited combustion command, LCC, and engine speed, ES. The error/notification logic block 114 is operable, as will be described in greater detail hereinafter, to process the foregoing inputs and produce as outputs a fueling growth derate high error value, FGDHE, and an excessive fueling growth error value, EFGE. The status of the FGDHE value, e.g., active or inactive, is stored in a memory block 116 as an error flag, and is also used to provide the E1 signal described above with respect to FIG. 1. Likewise, the status of the EFGE value is stored in a memory block 118 as an error flag, and is also used as the E2 signal produced by the fueling growth protection logic block 80.

Figure 3:
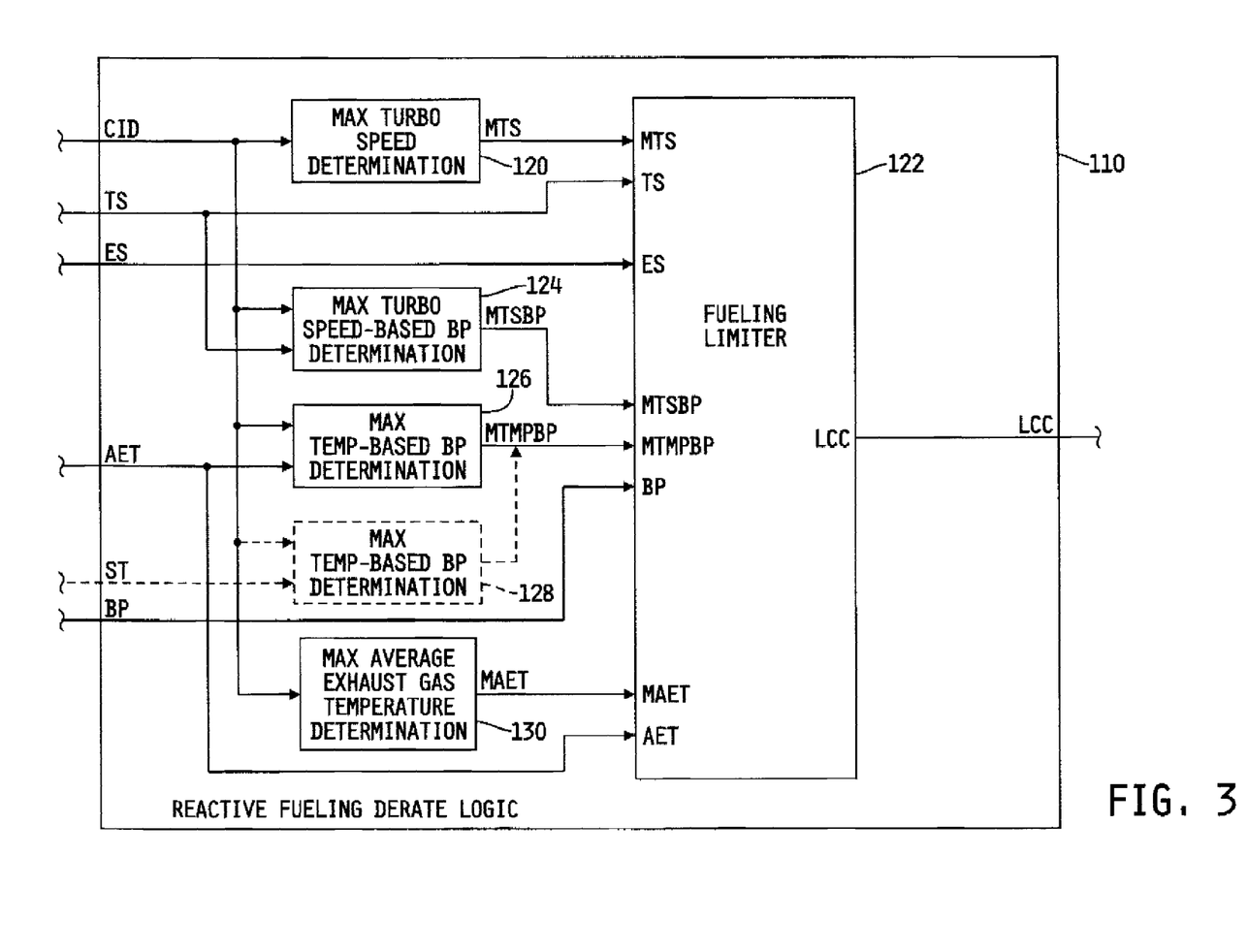
FIG. 3 is a block diagram of one illustrative embodiment of the reactive fueling derate logic block of FIG. 2.

Referring now to FIG. 3, one illustrative embodiment of the reactive fueling derate logic block 110 of FIG. 2 is shown. In the illustrative embodiment, the logic block 110 includes a maximum turbocharger speed determination block 120 that receives as an input the compressor inlet density value, CID, and produces as an output a maximum turbocharger speed value, MTS. The maximum turbocharger speed value, MTS, is provided as an input, along with the measured turbocharger speed value, TS, to a fueling limiter block 122.

The reactive fueling derate logic block 110 further includes a maximum turbocharger speed-boost pressure determination block 124 that is configured to receive as inputs the compressor inlet density value, CID, and the measured turbocharger speed, TS. The maximum turbocharger speed-based boost pressure determination block 124 is configured to process CID and TS, and to produce a maximum turbocharger speed boost pressure value, MTSBP, as a function thereof.

The reactive fueling derate logic block 110 further includes a maximum temperature-based boost pressure determination block 126 that is configured to receive as inputs the compressor inlet density value, CID, and the average exhaust temperature value, ET. The maximum temperature-based boost pressure determination block 126 is configured to process CID and AET, and to produce a maximum temperature boost pressure value, MTMPBP, as a function thereof. In embodiments that do not include the cylinder exhaust temperature sensors 44, 48, 52, 56, 60 and 64 as illustrated in FIG. 1, and instead include the so-called stack temperature sensors 72 and/or 76, the reactive fueling derate logic block 110 may include a maximum temperature based boost pressure determination block 128 that is configured to receive as inputs CID and the stack temperature value, ST, as shown by dashed-line representation in FIG. 3. In this embodiment, the maximum temperature-based boost pressure determination block 128 is configured to process CID and ST and produce MTMPBP as a function thereof. In any case, MTSBP, MEMPBP, and the measured boost pressure, BP, are all provided as inputs to the fueling limiter block 122.

The reactive fueling derate logic block 110 further includes a maximum average exhaust gas temperature determination block 130 configured to receive as an input the compressor inlet density value, CID, and to process CID to produce a maximum average exhaust temperature value, MAET. The maximum average exhaust temperature value, MAET, along with the average exhaust temperature value, AET, are both provided as inputs to the fueling limiter block 122. The engine speed, ES, is also provided as an input to the fueling limiter block 122. The fueling limiter block 122 is configured to process the foregoing input signals, and to produce the limited combustion command value, LCC, as a function thereof.

In one embodiment, the various determination blocks 120, 124, 126, 128 and 130 are provided in the form of tables that map the input value or values to their corresponding output value. Alternatively, any one or more of the blocks 120, 124, 126, 128 and/or 130 may be provided in other conventional forms such as, but not limited to, plots, charts, graphs, one or more equations or the like.

Figure 4:
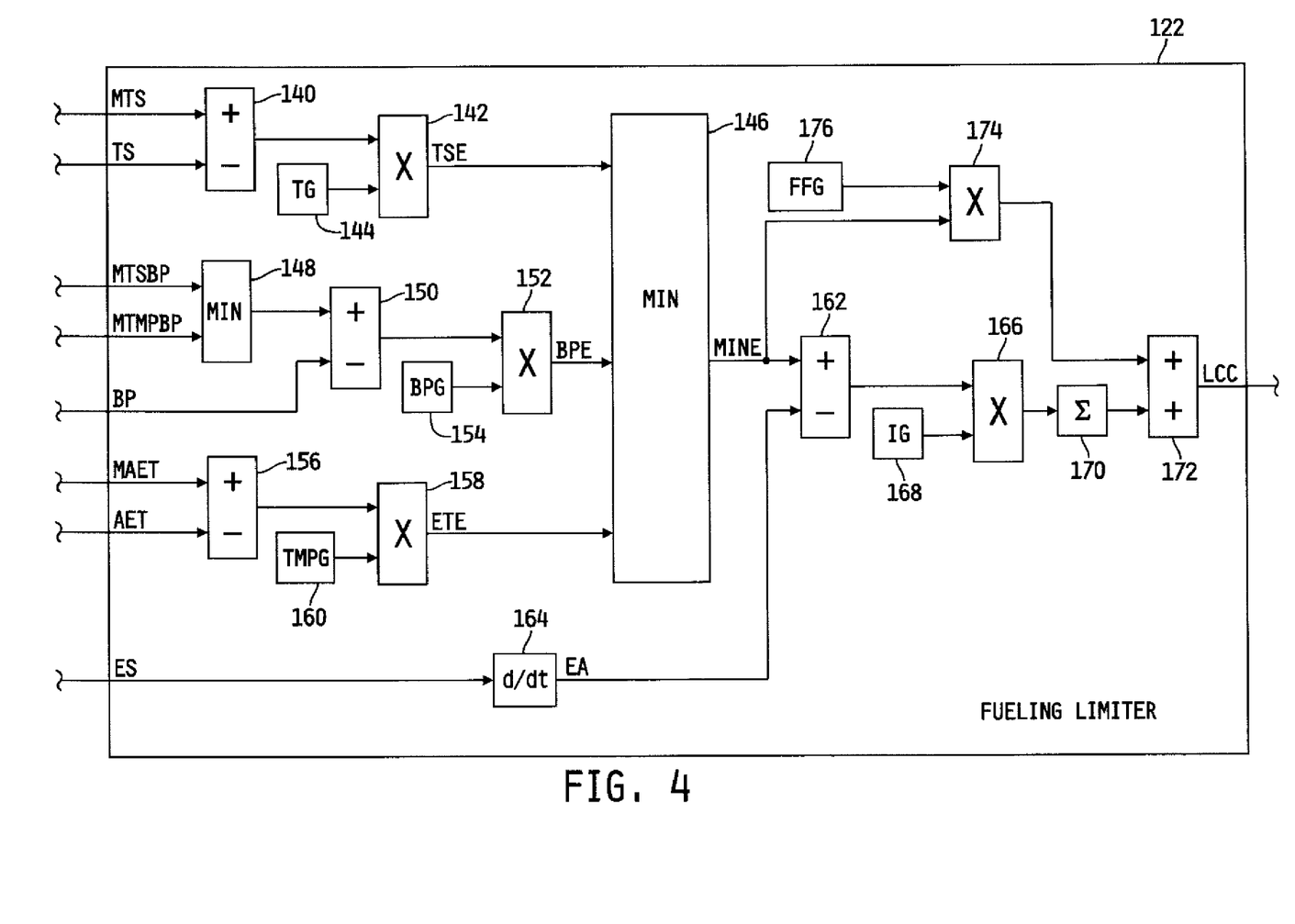
FIG. 4 is a block diagram of one illustrative embodiment of the fueling limiter block of FIG. 3.

Referring now to FIG. 4, one illustrative embodiment of the fueling limiter block 122 of FIG. 3 is shown. In the illustrated embodiment, the fueling limiter block 122 includes a difference block 140 having additive input that receives the maximum turbocharger speed, MTS, and a subtractive input that receives the measured turbocharger speed, TS. The output of the difference block 40 is thus the quantity (MTS−TS), and is multiplied using a multiplication block 142 by a programmable turbocharger speed gain value, TG, that is stored in a memory block 144. The output of the multiplication block 142 is a turbocharger speed error value, TSE, that is defined by the relationship TSE=TG*(MTS−TS), and is provided to one input of a MIN block 146.

The fueling limiter block 122 illustrated in FIG. 4 further includes a MIN block 148 receiving as inputs MTSBP and MTMPBP, the output of which is provided to an additive input of a difference block 150 having a subtractive input that receives the measured boost pressure, BP. The output of the difference block 150 is provided to one input of a multiplication block 152 having another input receiving a programmable boost pressure gain value, BPG, which is stored in a memory block 154. The output of the multiplication block 152 is a boost pressure error value, BPE, and that is defined by the relationship BPE=BPG*[MIN(MTSBP, MTNBP)−BP], which is provided to another input of the MIN block 146. The fueling limiter block 122 further includes another difference block 156 having an additive input that receives the maximum average exhaust temperature value, MAET, and a subtractive input that receives the average exhaust temperature value, AET. The output of the difference block 156 is provided to one input of a multiplication block 158 having another input that receives a programmable temperature gain value, TMPG, which is stored in a memory block 160. The output of the multiplication block 158 is an exhaust temperature error value, ETE, that is defined by relationship ETE=TMPG*(MAET−AET), which is provided to another input of the MIN block 146.

The output of the MIN block 146 is a minimum error value, MINE, which represents the minimum of the turbocharger speed error, TSE, the boost pressure error value, BPE, and the exhaust temperature error value, ETE. It will be understood that the present disclosure contemplates alternative embodiments of the reactive fueling derate logic block 110 and the fueling limiter block 122 in which the MIN block 146 receives as inputs fewer error values, and/or embodiments in which only one such error value is processed, in which embodiments the MIN block 146 is omitted. In one such alternative embodiment, for example, blocks 124-130 and 146-158 are omitted, and the minimum error value, MINE, is equal to the turbocharger speed error value, TSE. In another alternative embodiment, blocks 120, 130, 140-146 and 156-160 are omitted, and the minimum error value, MINE, is equal to the boost pressure error value, BPE. Within this alternative embodiment, the boost pressure error value, BPE, may be the minimum of MTSBP and MTMPBP as illustrated in FIGS. 3 and 4, or may alternatively be based only on MTSBP or MTMPBP alone. In another alternative embodiment, blocks 120-128 and 140-154 may be omitted, in which case the minimum error value, MINE, is equal to the exhaust temperature error value, ETE. In yet another alternative embodiment, the MIN block 146 is included in the fuel limiter block 142, but various ones of the blocks 120, 124-144 and 148-160 may be omitted such that MINE represents the minimum of only TSE and BPE, of only TSE and ETE, or of only BPE and ETE.

In any case, the minimum error value, MINE, is provided to an additive input of a difference block 162 having a subtractive input receiving the output of a differentiation block 164. The differentiation block 164 receives as an input the engine speed, ES, and therefore produces as an output an engine acceleration value, EA, which is provided to the subtractive input of the difference block 162. The output of the difference block 162 is provided as an input to a multiplication block 166 having another input receiving a programmable integral gain value, IG, which is stored in a memory block 168. The output of the multiplication block 166 is provided as an input to a discrete integrator block 170 having an output that is provided as an input to a summation block 172. The minimum error value, MINE, is also provided as an input to a multiplication block 174 having another input receiving a programmable feed forward gain value, FFG, that is stored in a memory block 176. The output of the multiplication block 174 is provided to another input of the summation block 172, the output of which is the limited combustion command value, LCC. Blocks 162-176 thus operate as a conventional feed-forward, integral-derivative controller that produces the limited combustion command value, LCC, as a function of MINE and ES.

Figure 5:
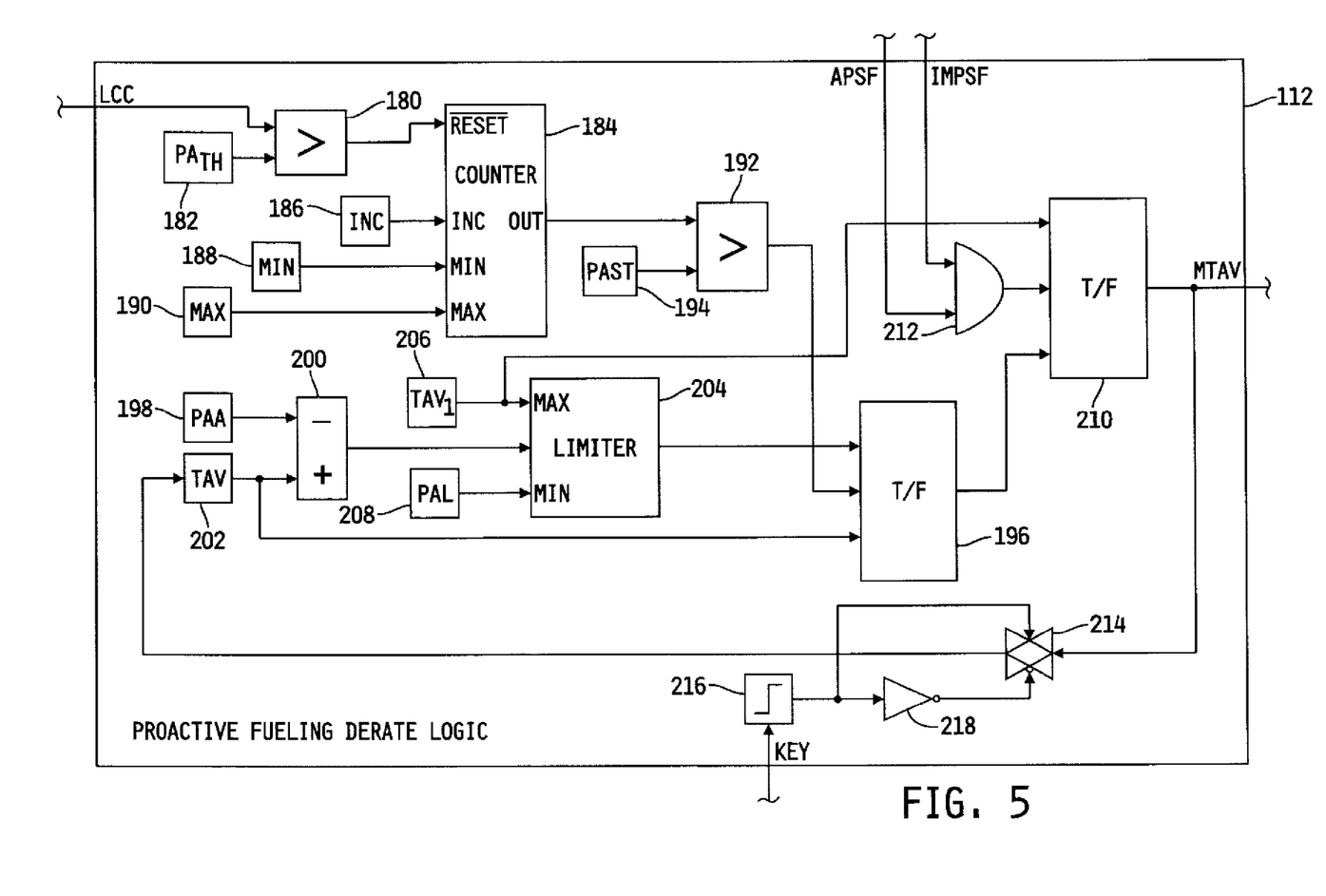
FIG. 5 is a block diagram of one illustrative embodiment of the proactive fueling derate logic block of FIG. 2.

Referring now to FIG. 5, one illustrative embodiment of the proactive fueling derate logic block 112 of FIG. 2 is shown. In the illustrated embodiment, the proactive fueling derate logic block 112 includes a "greater than" block 180 having one input receiving the limited combustion command, LCC, and another input receiving a programmable proactive adjustment threshold value, $PA_{TH}$, that is stored in a memory block 182. The output of the "greater than" block 180 is provided to a RESET input of a counter block 184. The counter block 184 includes an increment input, INC, that receives a programmable increment value, INC, that is stored in a memory block 186, a minimum input, MIN, that receives a programmable minimum value, MIN, that is stored in a memory block 188, in a maximum input, MAX, that receives a programmable maximum value, MAX, that is stored in memory block 190. The counter 184 is configured in a conventional manner, to produce a count value at an output, OUT, in increments of INC, between count values of MIN and MAX. The output, OUT, of the counter block 184 is provided as an input to another "greater than" block 192 having another input receiving a programmable proactive set time, PAST, that is stored in a memory block 194. The output of the "greater than" block 192 is provided to a control input of a true/false block 196. The counter block 184 is configured to be reset as long as LCC is less than or equal to $PA_{TH}$, and when LCC exceeds $PA_{TH}$, the counter block 184 begins counting upwardly from MIN in increments of INC. When the count value of the counter 184 exceeds PAST, the control input of the true/false block 196 changes from "0" to "1."

The proactive fueling derate logic block 112 further includes a difference block 200 having a subtractive input that receives a programmable proactive adjustment amount value, PAA, that is stored in a memory block 198, and an additive input that receives a timing adjustment value, TAV, that is stored in another memory block 202. The output of the difference block 200 is provided to a limiter block 204 having a maximum value input, MAX, receiving an initial timing adjustment value, $TAV_I$, that is stored in a memory block 206, and a minimum input, MIN, that receives a programmable proactive adjustment limit value, PAL, that is stored in a memory block 208. The output of the limiter block 204 is provided as the "true" input of the true/false block 196, and the timing adjustment value, TAV, is provided as the "false" input of the true/false block 196.

The output of the true/false block 196 is provided to a "false" input of another true/false block 210 having a "true" input receiving the initial timing adjustment value, $TAV_I$, that is stored in the memory block 206. The control input of the true/false block 210 is provided by the output of an AND gate 212 having a one input receiving the ambient pressure sensor fault value, APSF, and another input receiving the intake manifold pressure sensor fault value, IMPSF. The output of the true/false block is the modified timing adjustment value, MTAV, which is also provided as an input to a transmission gate 214. The output of the transmission gate 214 is provided as an input to the memory block 202. The clock or gate value of the transmission gate 214 is provided by the output of the edge protector block 216, and an inverse clock or gate signal to the transmission gate 214 is provided by the output of an inverter gate 218 having an input receiving the output of the edge protector block 216. The edge protector block 216 receives as an input the ignition key input, KEY.

The proactive fueling derate logic block 112 illustrated in FIG. 5 is operable to produce as the modified timing adjustment value, MTAV, the initial timing adjustment value, $TAV_I$, if the ambient pressure sensor and all of the intake manifold pressure sensors have failed, e.g., APSF equals "1" and IMPSF equals "1." Otherwise, MTAV is the output of the true/false block 196. The output of the true/false block 196 depends on the status of the limited combustion command, LCC, as compared with the proactive adjustment threshold value, $PA_{TH}$. Specifically, if LCC is greater than $PA_{TH}$ for more than the time period PAST, the output of the true/false block 196 is the output of the limiter block 204, and is otherwise equal to the current value of the timing adjustment value, TAV. The output of the limiter block 204 represents the current value of the timing adjustment value, TAV, decremented by the proactive adjustment amount, PAA, which is limited by the limiter block 204 to a minimum value of PAL. The edge detection block 216 is configured as a positive edge detector, so that the current value of MTAV is loaded into the timing adjustment value block, TAV, only when the ignition key transition from its "off" state to its "on" state, e.g., upon engine start up. Thus, for each key cycle, the current value of TAV is decremented by the proactive adjustment amount, PAA, and is provided as the modified timing adjustment value, MTAV, if during that key cycle LCC is greater than $PA_{TH}$ for at least the time period PAST and provided that both APSF and IMPSF are not "1."

The timing adjustment value, TAV that is stored in the memory block 202 is initially set to the initial timing adjustment value, $TAV_I$. Initially during operation of the fueling growth protection logic block 80, i.e., when the fuel injectors are not worn, LCC will typically not exceed $PA_{TH}$, and MTAV will therefore be set to $TAV_I$, assuming that at least one of ASPF and IMPSF is "0." If, during the current or a subsequent key cycle, LCC exceeds $PA_{TH}$ for at least the time duration PAST, and at least one of ASPF and IMPSF is "0," MTAV is set to $TAV_I$–PAA. Upon detection of the next key cycle, the current value of MTAV ($TAV_I$–PAA) is loaded via the transmission gate 214 into the memory block 202 so that the current value of TAV becomes ($TAV_I$–PAA). If/when the above process repeats, MTAV will be set to the value MTAV=$TAV_I$–(2*PAA), and TAV will likewise be set to the value TAV=$TAV_I$–(2*PAA) upon detection of the next key cycle. This process repeats until TAV–PAA falls below PAL, in which case MTAV is limited to the minimum value PAL.

Figure 6:
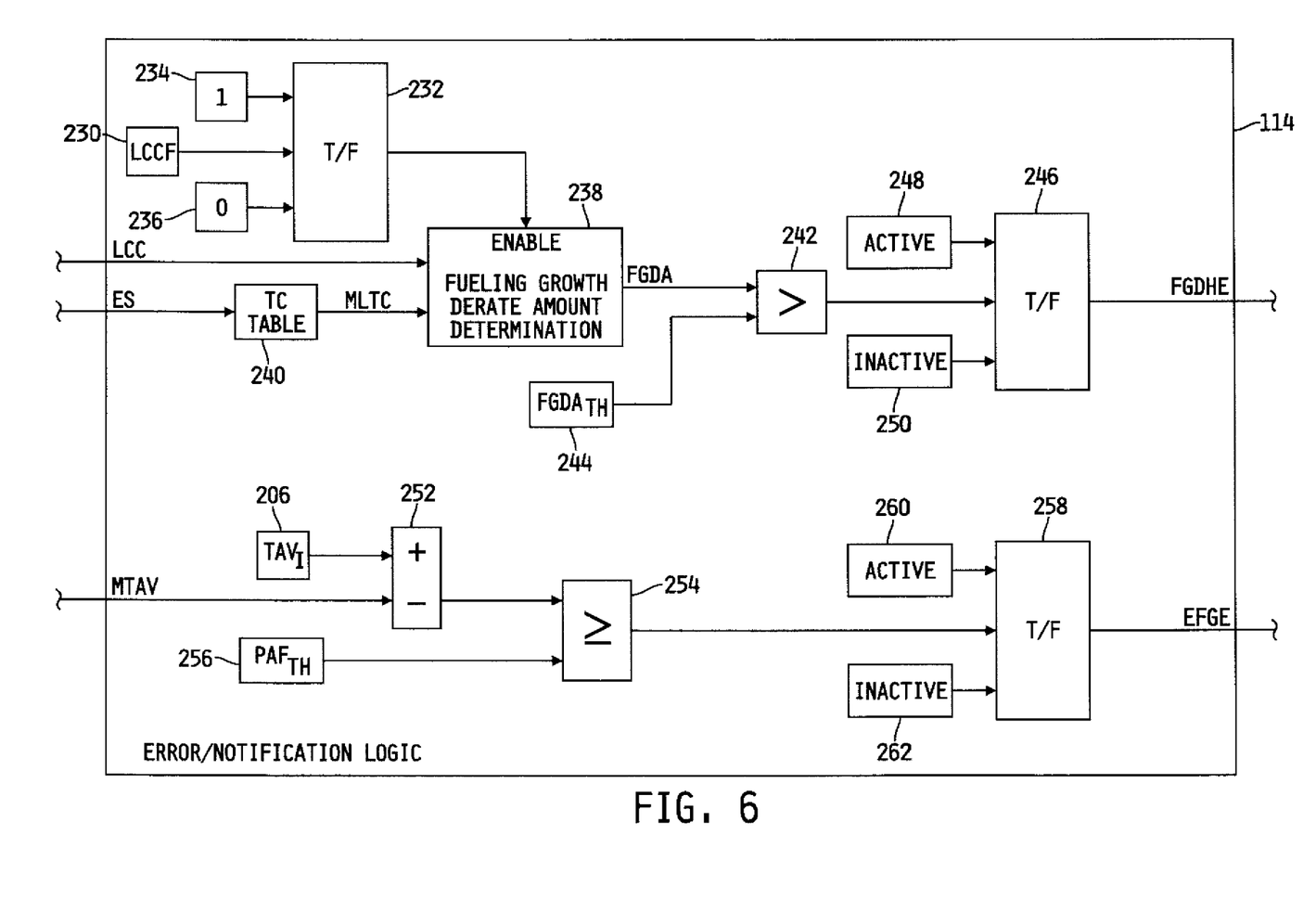
FIG. 6 is a block diagram of one illustrative embodiment of the error/notification logic block of FIG. 2.

Referring now to FIG. 6, one illustrative embodiment of the error/notification logic block 114 is shown. In the illustrated embodiment, the error/notification logic block includes a memory block 230 that contains a limited combustion command flag, LCCF, the status of which is indicative of whether engine fueling is currently being limited by the limited combustion command value, LCC. In one embodiment, for example, if engine fueling is currently being limited by LCC, the value of LCCF is "1" or "active," and is otherwise "0" or "inactive." It will be recognized, however, that other indicators and/or values may be used to distinguish between operating conditions in which engine fueling is being limited by LCC and operating conditions in which engine fueling is not being limited by LCC. In any case, the output of the memory block 230 is provided as a control input to a true/false block 232 having a "true" input receiving the value "1" that is stored in a memory block 234 and a "false" receiving the value "0" that is stored in memory block 236. The output of the true/false block 232 is thus "1" when LCCF is "1" or "active," and is otherwise "0" or "inactive."

The output of a true/false block 232 is provided as an enable input to a fueling growth derate amount determination block 238 having one input receiving the limited combustion command value, LCC, and another input receiving a maximum load torque curve value, MLTC. The maximum load torque curve value, MLTC, is the output of a torque curve table or map 240 receiving as an input the engine speed, ES. In this illustrative embodiment, the torque curve table 240 is configured to map current values of engine speed, ES, to maximum values of engine output torque under present engine speed conditions. Alternatively, the torque curve table 240 may be implemented in the form of one or more equations, graphs, tables and/or other conventional mapping structures that map the current engine speed values, ES, to maximum engine output torque values. In any case, the fueling growth derate amount determination block 238 is operable, when enabled by the true/false block 232, to determine a fueling growth derate amount, FGDA, as a function of LCC and MLTC. In one embodiment, for example, the fueling growth derate amount determination block 238 is configured to compute, FGDA, according to the equation FGDA= (MLTC–LCC)/MLTC. It will be understood, however, that the fueling growth derate amount determination block 238 may alternatively be configured to compute FGDA according to one or more other functions of LCC and MLTC.

The output of the fueling growth derate determination block 238 is provided as an input to a "greater than" block 242 having another input receiving a programmable fueling growth determination amount threshold value, $FGDA_{TH}$, that is stored in a memory block 244. The output of the "greater than" block 242 is provided as a control input to a true/false block 246 having a "true" input receiving an "active" value that is stored in a memory block 248, and a "false" input that receives an "inactive" value that is stored in another memory block 250. The output of the true/false block is the fueling growth derate high error value, FGDHE. As illustrated in FIG. 6, the value of FGDHE will be "active" as long as FGDA is greater than $FGDA_{TH}$, and is otherwise "inactive." Thus, whenever engine fueling is being limited by the limited combustion command value, LCC, the fueling growth derate determination block 238 is operable to compute the fueling growth determination amount, FGDA as a function of LCC and MLTC, and the state of the fueling growth derate high error value, FGDHE, is then determined based on a comparison between FGDA and $FGDA_{TH}$ as just described.

The error/notification logic block 114 further includes a difference block 252 having an additive input that receives the initial timing adjustment value, $TAV_I$, that is stored in the memory block 206 (FIG. 5), and a subtractive input that receives the modified timing adjustment value, MTAV that is produced by the proactive fueling derate logic block 112. The output of the difference block 252 is provided as one input to a "greater than or equal to" block 254 having another input that receives a programmable proactive adjustment fault threshold value, $PAF_{TH}$, which is stored in a memory block 256. The output of the "greater than or equal to" block 254 is provided as a control input to a true/false block 258 having a "true" input that receives an "active" value that is stored in a memory block 260 and a "false" input that receives an "inactive" value that is stored in a memory block 262. The output of the true/false block 258 is the excessive fueling and growth error value, EFGE. Thus, the error/notification logic block 114 is operable to monitor changes in MTAV from its initial value $TAV_I$, and to set the excessive fueling growth error value, EFGE, to "active" if the change in MTAV from $TAV_I$ exceeds the proactive adjustment fault threshold value, $PAF_{TH}$, and to otherwise set EFGE to "inactive."

Figure 7:
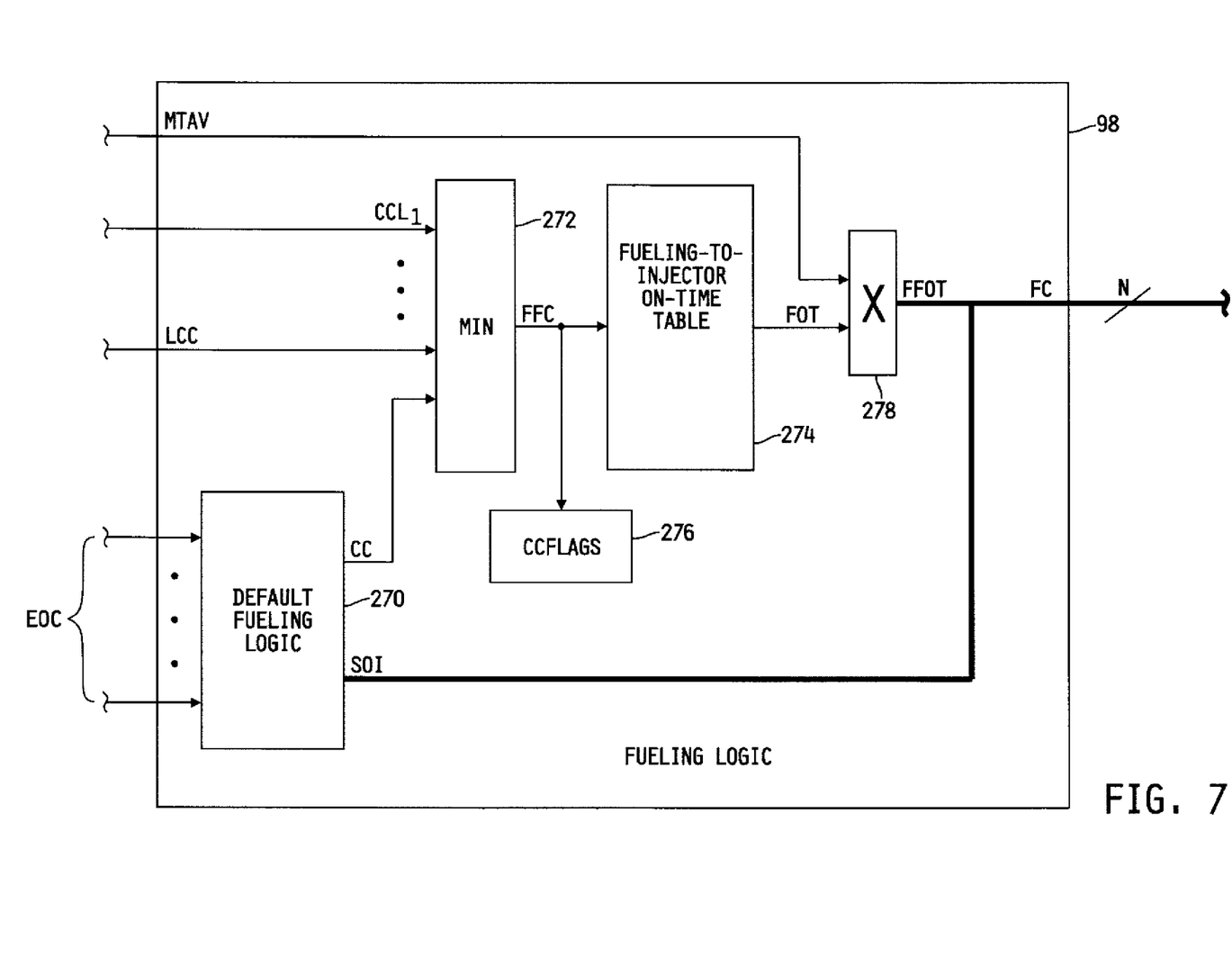
FIG. 7 is a block diagram of one illustrative embodiment of the fueling logic block of FIG. 1.

Referring now to FIG. 7, one illustrative embodiment of the fueling logic block 98 of FIG. 1 is shown. In the illustrated embodiment, the fueling logic block 98 includes a default fueling logic block 270 that receives a number of engine operating conditions, ECC, as inputs thereto. The default fueling logic block is operable, in a conventional manner, to produce a combustion command value, CC, which corresponds to a fueling amount value, and also a so-called start-of-injection command SOI, which corresponds to the timing of the start of fuel injection of one or more fuel injectors relative to a reference value, e.g., engine crank angle. The fueling logic block 98 further includes a MIN block 272 that receives the combustion command value, CC, that is provided by the default fueling logic block 270, and further receives a number of combustion command limiting values, $CCL_1$, etc., one of which is the limited combustion command value, LCC, that is provided by the reactive fueling derate logic block 110. The output of the MIN block 272 is a final fueling command value, FFC, which corresponds to a final fueling amount value. The final fueling command, FFC, is provided to a combustion command flag block (CCFLAGS) 276 that monitors which of the number of combustion commands, CC, LCC, $CCL_1$, etc., provided as inputs to the MIN block 272 are currently controlling engine fueling. It is from the CCFLAGS block 276 that the status of the limited combustion command flag value, LCCF, of the memory block 230 of FIG. 6 is determined. Thus, if the final fueling command, LCC, is equal to FFC, LCCF is set by the CCFLAGS block 276 to "1," and is otherwise set to "0."

The final fueling command, FFC, is also provided to as an input to a conventional fueling-to-injector on-time-table 274, which is configured to process the final fuel command value, FFC, and produce a corresponding fueling on time value, FOT. The fueling-to-injector on-time-table 274 is illustratively a conventional table, graph, chart or one or more equations, that is/are used to convert the fueling amount values, FFC, to injector on-times corresponding to time durations during which the one or more fuel injectors is/are activated to inject fuel into the engine 12. The default fueling logic block 270, MIN block 272 and fueling-to-injector on-time-table 274 are all conventional fueling logic blocks, the operations of which are known. In the embodiment illustrated in FIG. 7, the fueling logic block 98 further includes a multiplication block 278 having one input receiving the fueling on-time value, FOT, and another input receiving the modified timing adjustment value, MTAV, that is produced by the proactive fueling derate logic block 112. The output of the multiplication block 278 is a final fueling on time value, FFOT, which, together with the start-of-injection value, SOI, comprise the fueling command signal, FC that is produced on the one or more signal paths 99 and supplied to the fuel system 100 as shown in FIG. 1.

In the embodiment illustrated in FIG. 7, the modified timing adjustment value, MTAV, is a numerical scale factor that is multiplied by FOT to produce FFOT. In this embodiment, the values TAV, PAA, $TAV_I$ and PAL of the proactive fueling derate logic block 112 of FIG. 5 likewise represent corresponding numerical scale values. It will be understood, however, that this disclosure contemplates other embodiments in which the final fueling on-time values, FFOT, are determined using alternate computational techniques. In one alternative embodiment, for example, the values MTAV, TAV, PAA, $TAV_I$ and PAL are numerical timing values that are selected such that MTAV represents an offset value that is added to, or subtracted from, the fueling on-time values, FOT. In another alternate embodiment, MTAV, TAV, PAA, $TAV_I$ and PAL are again numerical timing values that are selected such that MTAV represents a limited fueling on-time value that is provided, along with FOT, to a MIN block so that FFOT is the minimum of MTAV and FOT. It will further be understood that the limited fueling command, LCC, although illustrated in the drawings as an actual fueling command, may alternatively be implemented as a scale factor to be multiplied by the output of the MIN block 272 to produce FFC, or alternatively still be implemented as a limited fueling command offset value to be added to, or subtracted from the output of the MIN block 272.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. "0."

What is claimed is:

1. A method for controlling fueling of an internal combustion engine, the engine including an intake manifold, one or more exhaust manifolds and a turbocharger coupled between the intake and exhaust manifolds, the method comprising:
   determining ambient pressure,
   estimating an air inlet density of a compressor of the turbocharger as a function of the determined ambient pressure,
   determining a maximum value of engine exhaust temperature as a function of the air inlet density of the compressor of the turbocharger,
   measuring engine exhaust temperature,
   determining an error value as a function of the maximum value of the engine exhaust temperature and the measured engine exhaust temperature, and
   limiting fuel supplied to the engine based on the error value.

2. The method of claim 1 wherein the measuring engine exhaust temperature comprises:
   measuring a cylinder exhaust temperature produced by each cylinder of the engine, and
   computing an average of the measured cylinder exhaust temperatures.

3. The method of claim 2 wherein determining the maximum value of engine exhaust temperature comprises determining a maximum value of the average exhaust temperature as a function of the air inlet density of the compressor of the turbocharger, the maximum value of the average exhaust temperature corresponding to the maximum value of the average of the cylinder exhaust temperatures.

4. The method of claim 1 wherein limiting fuel supplied to the engine comprises:
   determining an engine acceleration value,
   determining a limit value as a function of the error value and of the engine acceleration value in a manner that limits the engine exhaust temperature to the maximum value of engine exhaust temperature, and
   limiting fuel supplied to the engine as a function of the limit value.

* * * * *